(12) United States Patent
Kano et al.

(10) Patent No.: US 11,172,662 B2
(45) Date of Patent: Nov. 16, 2021

(54) DOUBLE BEARING REEL

(71) Applicant: GLOBERIDE, Inc., Tokyo (JP)

(72) Inventors: Shuta Kano, Tokyo (JP); Masakazu Noguchi, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 44 days.

(21) Appl. No.: 16/750,135

(22) Filed: Jan. 23, 2020

(65) Prior Publication Data

US 2020/0236919 A1 Jul. 30, 2020

(30) Foreign Application Priority Data

Jan. 29, 2019 (JP) ............................. JP2019-012877

(51) Int. Cl.
*A01K 89/01* (2006.01)
*A01K 89/0155* (2006.01)
*A01K 89/033* (2006.01)
*A01K 89/015* (2006.01)

(52) U.S. Cl.
CPC ...... *A01K 89/01555* (2013.01); *A01K 89/045* (2015.05); *A01K 89/01931* (2015.05)

(58) Field of Classification Search
CPC ..................... A01K 89/01555; A01K 89/059
See application file for complete search history.

(56) References Cited

U.S. PATENT DOCUMENTS

| | | | | |
|---|---|---|---|---|
| 5,692,693 A | * | 12/1997 | Yamaguchi | A01K 89/01555 242/288 |
| 7,631,829 B2 | * | 12/2009 | Tsutsumi | A01K 89/01555 242/288 |
| 2007/0108330 A1 | * | 5/2007 | Ikuta | A01K 89/01555 242/288 |
| 2013/0306777 A1 | | 11/2013 | Ikebukuro | |
| 2016/0037759 A1 | | 2/2016 | Ikebukuro | |

FOREIGN PATENT DOCUMENTS

| | | | | |
|---|---|---|---|---|
| JP | 2005034128 A | * | 2/2005 | ......... A01K 89/0155 |
| JP | 2005034128 A | | 2/2005 | |
| JP | 4276970 B2 | * | 6/2009 | ......... A01K 89/0155 |
| JP | 5690291 B2 | | 3/2015 | |
| JP | 5944742 B2 | | 7/2016 | |

OTHER PUBLICATIONS

Chinese Office Action for related Chinese Application No. 202010035910.9; action dated Jul. 5, 2021; (13 pages).

* cited by examiner

*Primary Examiner* — Emmanuel M Marcelo
(74) *Attorney, Agent, or Firm* — K&L Gates LLP

(57) ABSTRACT

A double bearing reel includes a spool braking device that rotatably supports a spool including a bobbin body on which a fishing line is wound and flange portions formed on both sides of the bobbin body between side plates of a reel body and that applies a braking force to the rotation of the spool, wherein the spool braking device includes a conductive annular body that rotates integrally with the spool and a magnet facing outer peripheral surface of the conductive annular body, and the conductive annular body and the magnet are disposed axially inward of an outer end surface of the flange portions and radially inward of the bobbin body.

4 Claims, 2 Drawing Sheets

DOUBLE BEARING REEL

TECHNICAL FIELD

This disclosure relates to a double bearing reel having a spool braking device that applies a braking force to the free rotation of a spool when a fishing line is released.

BACKGROUND

The double bearing reel incorporates a spool braking device that prevents a backlash phenomenon caused by the excessive rotation of the spool when a fishing line is released by switching the spool on which the fishing line is wound from a power transmission mode (fishing line winding mode) to a free rotation mode using a clutch mechanism.

Generally, as disclosed in, for example, Japanese Patent Nos. 5690291 and 5944742, the spool braking device is configured to automatically adjust the magnetic force acting on the spool depending on the spool rotation speed, thereby controlling the spool rotation speed.

The spool braking device disclosed in JP '291 is configured to insert and remove a conductive annular body that integrally rotates with the spool into and from a gap of an annular magnet disposed axially outward of a flange of the spool by a cam action corresponding to the spool rotation speed. The spool braking device disclosed in JP '742 is configured such that a magnet that rotates integrally with the spool is inserted into, and removed from, the inner side of the bobbin body of the spool (constituting a conductive body) by a cam action corresponding to the spool rotation speed.

However, in the spool braking device disclosed in JP '291, since the magnet constituting the magnetic field generating device is disposed axially outward of the flange of the spool, and the conductive body that rotates integrally with the spool (a portion radially facing the magnet) is also disposed axially outward of the flange of the spool, the entire reel body is increased in size in the axial direction and consequently in weight. Further, the inertia of the magnetic field generating portion that rotates integrally with the spool including the conductive body is also increased with the inevitable increase in weight of the magnetic field generating portion by the above-described configuration, which deteriorates the casting performance.

The spool braking device disclosed in JP '742 has a configuration in which the inner circumference of the bobbin body of the spool is a conductive body. Since a magnetic field generating portion such as a magnet disposed axially outward of the flange of the spool is inserted into, and removed from, the conductive body (inner circumference of the bobbin body,) the entire reel body is increased in size in the axial direction and consequently in weight. Further, since the diameter of the bobbin body defining the bobbin winding amount greatly influences the braking force and the characteristics, it becomes difficult to develop variations of the spool bobbin winding amount.

It could therefore be helpful to provide a double bearing reel having a spool braking device capable of reducing the size and weight of the reel body and improving the braking efficiency of the spool.

SUMMARY

We thus provide:

A double bearing reel has a spool braking device that rotatably supports a spool including a bobbin body on which a fishing line is wound and flange portions formed on both sides of the bobbin body between the side plates of the reel body and that applies a braking force to the rotation of the spool, wherein the spool braking device includes a conductive annular body that rotates integrally with the spool and a magnet facing the outer peripheral surface of the conductive annular body, and is characterized in that the conductive annular body and the magnet are disposed axially inward of the outer end surface of the flange portions and radially inward of the bobbin body.

The double bearing reel having the above-mentioned configuration can reduce the size and weight of the reel body since the magnet and the conductive annular body of the magnetic field generating portion constituting the spool braking device are accommodated and arranged in a limited space within the spool width inside the bobbin body of the spool, and can also realize low inertia and improve the braking efficiency of the spool since the magnetic field generating portion can be accommodated compactly within the bobbin body.

It is thus possible to obtain a double bearing reel with reduced size and weight of the reel body and improved braking efficiency of the spool at the time of free rotation.

DESCRIPTION OF THE NUMERICAL REFERENCES

Figure 1:
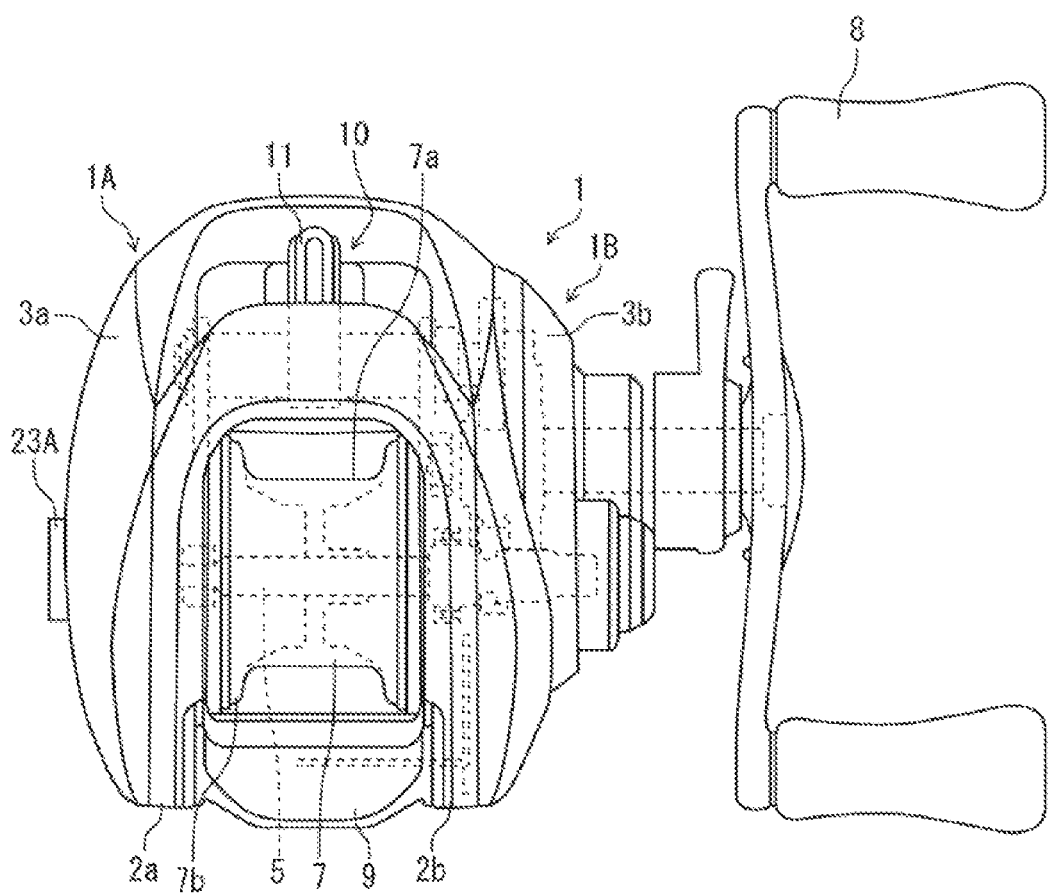
FIG. 1 shows a plan view indicating an example of a double bearing reel.

1 Reel body
5 Spool shaft
7 Spool
7a Bobbin body
7b Flange portion
20 Spool braking device
20A Magnetic field generating portion
21 Magnet
25 Conductive annular body
25b Annular wall portion
28 Moving member
30 Energizing member
40 Fixing member
50 Cam portion

DETAILED DESCRIPTION

Hereinafter, a double bearing reel will be described with reference to the drawings.

Figure 2:
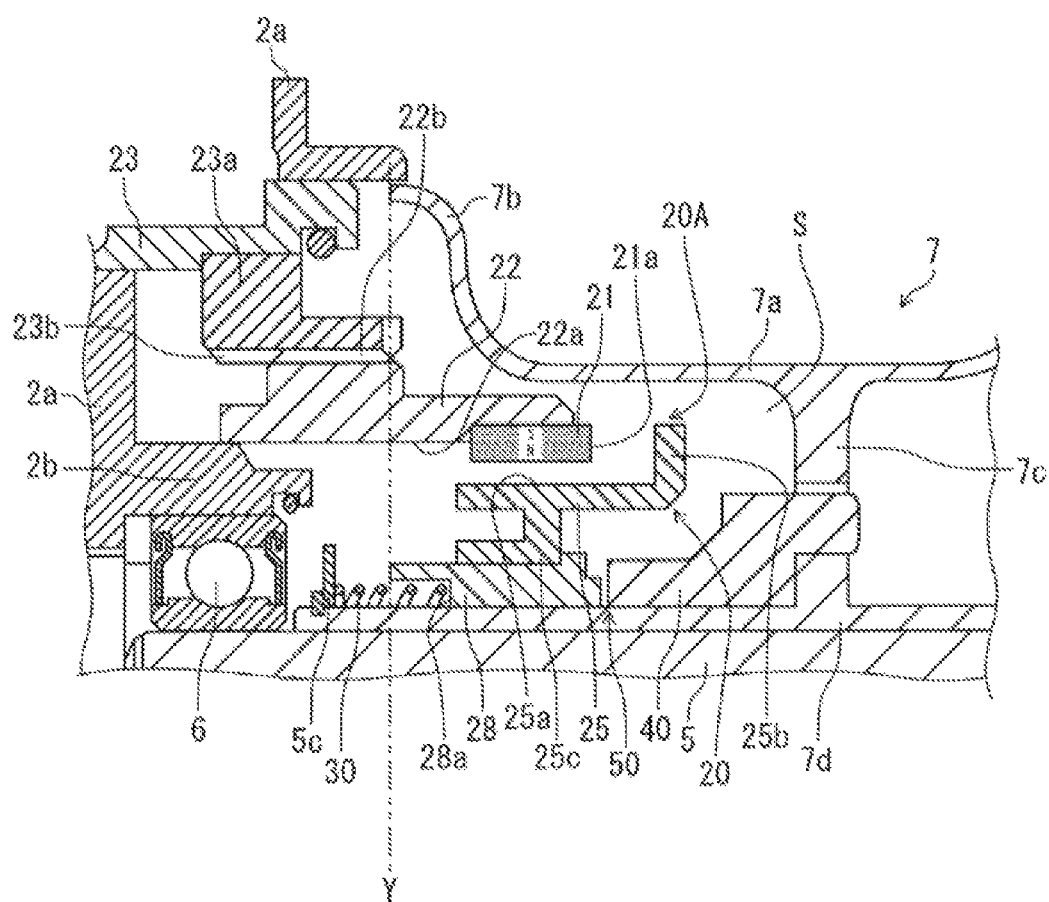
FIG. 2 shows a view indicating an example of a spool braking device mounted on a spool shaft in the configuration of FIG. 1.

FIG. 1 shows a plan view indicating an example of a double bearing reel, and FIG. 2 shows a view indicating an example of a spool braking device mounted on a spool shaft in the configuration of FIG. 1.

The double bearing reel according to the example has a reel body 1 with left and right side plates 1A and 1B in which left and right frames 2a and 2b are covered with left and right covers 3a and 3b. Between the left and right side plates, a spool shaft 5 is rotatably supported via a bearing 6 (which is disposed on the left frame side in FIG. 2) and a spool 7 around which a fishing line is wound is integrally fixed to the spool shaft 5 via a support 7d fitted to the spool shaft 5. The spool 7 includes a bobbin body 7a, flange portions 7b integrally formed on both left and right sides of the spool 7, and a central annular wall 7c integrally formed between the center of the bobbin body 7a and the support 7d, and the fishing line regulated by the left and right flange portions 7b is wound around the bobbin body 7a.

In the example, a handle 8 that rotationally drives the spool 7 is disposed on the right side plate 1B side, and a known power transmission mechanism (not illustrated) that transmits the rotational driving force of the handle 8 to the spool shaft 5 is arranged between the right frame 2b and the right cover 3b. A known clutch mechanism that switches the spool shaft 5 between a power transmission mode and a power cut-off mode is arranged between the right frame 2b and the right cover 3b, and the clutch mechanism is configured to be switched from a clutch ON mode (power transmission mode) to an OFF mode (power cut-off mode; spool-free rotational mode) by depressing a clutch switching operating member 9 arranged between the left and right side plates on the rear side of the spool 7. The clutch OFF mode can be returned to the clutch ON mode when the handle 8 is rotated through a known return mechanism.

A known level wind device 10 is arranged between the left and right side plates 1A and 1B on the fishing line releasing side of the spool 7. The level wind device 10 is configured such that a line guide body 11 into which a fishing line is inserted moves from side to side by rotating the handle 8, resulting in the fishing line being uniformly wound around the bobbin body 7a of the spool 7 when the fishing line is wound up.

A spool braking device (backlash prevention device) 20 that applies a braking force to the spool 7 to prevent excessive rotation when the fishing line is released is disposed on the side plate on the opposite side of the handle (on the side of the left side plate.)

Hereinafter, an example of the spool braking device 20 will be described in detail with reference to FIG. 2.

The spool braking device 20 is configured to apply a braking force by magnetic action when the spool 7 excessively rotates in a spool-free rotation mode, and the braking force can be changed depending on the rotation speed of the spool 7. For this reason, the spool braking device 20 includes a magnetic field generating portion 20A having a magnet and a conductive body, and, as described in detail below, members constituting the magnetic field generating portion 20A are disposed in an accommodation space S inside the spool 7, in particular, axially inward of the axially outer end surface of one of the flange portions 7b on the opposite side of the handle 8 (such outer end surface is shown by a broken line Y in FIG. 2,) and radially inward of the bobbin body 7a.

The accommodation space S is a portion surrounded by the bobbin body 7a, the central annular wall 7c and the support 7d of the spool 7 axially inward of an axially outer end surface Y of the flange portion 7b, and the magnetic field generating portion 20A of the spool braking device 20 is disposed in the accommodation space S. More specifically, the magnetic field generating portion 20A includes a magnet 21 disposed in the accommodation space S and a conductive annular body 25 which is a conductive body rotating integrally with the spool shaft 5, and the conductive annular body 25 moves so that the relative position with respect to the magnet 21 can be changed in the axial direction (the example relatively moves in the axial direction) depending on the spool rotation speed. For this reason, the magnet 21 is disposed in the accommodation space S to face a cylindrical portion 25a of the conductive annular body 25 in the radial direction with a certain gap therebetween.

The magnet 21 is attached to the tip end side of an inner peripheral surface 22a of a holding portion 22 in an annular shape, and is formed in a ring shape to face the cylindrical portion 25a of the conductive annular body 25. In this example, the magnet 21 itself may be configured in a ring shape, or may be configured by serially arranging (in a ring shape) a large number of magnets along the circumferential direction on the inner peripheral surface 22a on the tip end side of the holding portion 22. The magnet 21 of the example is formed in a ring shape, and has a configuration in which a north pole and a south pole are magnetized in the radial direction.

The holding portion 22 is supported to be movable in the axial direction with respect to a left frame 2a so that the magnet 21 attached to the tip end thereof is also movable in the axial direction. More specifically, the holding portion 22 that is axially movably fixed and supported is disposed on the outer periphery of a cylindrical support 2b that is integrated with the frame 2a, and a male screw portion 22b is formed on the outer peripheral surface thereof. A female screw portion 23b of an operation member 23a rotatably supported by a holding member 23 held with respect to the left frame 2a is screwed to the male screw portion 22b. The operation member 23a is rotatable by rotating an external operation member (e.g., a dial-shaped operation piece as shown in FIG. 1) 23A projecting from a left cover 3a, and the magnet 21 is axially movable through the operation member 23a and the holding portion 22. That is, the initial position of the facing distance (magnetic force) of the magnet 21 with respect to the conductive annular 25 can be adjusted by rotating the external operation member 23A, which makes it possible to adjust in advance the braking characteristics corresponding to the braking force at the initial stage of braking and the rotation speed.

Though the magnet 21 is movable in the axial direction within the accommodation space S by rotating the external operation member 23A, the magnet 21 may be held by the holding portion 22 so that part of the magnet 21 overlaps with the axial outer end surface Y of the flange portion 7b when the magnet 21 moves in the most axially outward direction. The configuration and the operation method of the external operation member 23A are not particularly limited, and may be arranged and configured so that the operation member 23a can be directly rotated.

The conductive annular body 25 is configured in a substantially cylindrical shape, is a member that exhibits a braking function when subjected to a magnetic action of the magnet 21, and is configured to be subjected to an increasingly large magnetic action with the increase of the rotation speed of the spool 7. That is, with the increase of the rotation speed of the spool 7, when the facing distance with respect to the magnet 21 lessens by the cam action described later, the electromagnetic force (braking force) acting on the conductive annular body 25 increases, which also increases the braking force to the spool 7 (the idling phenomenon of the spool 7 is inhibited whereby the backlash of the fishing line released is suppressed.)

Hereinafter, the configuration of the magnetic field generating portion 20A formed of the magnet 21 and the conductive annular body 25 according to the example will be described.

The conductive annular body 25 in a substantially cylindrical shape has: the cylindrical portion 25a that radially faces the magnet 21; an annular wall portion 25b disposed, with an interval, facing in the axial direction with respect to a tip end surface 21a of the magnet 21 (on the side of the central annular wall 7c of the spool 7); and a base portion 25c fixed to a cylindrical moving member 28 held to be slidable in the axial direction with respect to the support 7d, and is configured to move so that the relative position with respect to the magnet 21 can be changed depending on the spool rotation speed.

That is, the annular wall portion 25b integrally formed on the conductive annular body 25 is axially displaced together with the moving member 28 so that the relative position of the magnet 21 with respect to the tip end surface 21a can be changed (axially displaced.) In this example, the annular wall portion 25b is a portion that approaches/moves away from the tip end surface 21a of the magnet 21 in the axial direction depending on the spool rotation speed. As the annular wall portion 25b approaches, the magnetic force between the annular wall portion 25b and the tip end surface 21a of the magnet 21 increases, the braking force acting on the conductive annular body 25 becomes strong, and as the annular wall portion 25b moves away, the braking force becomes weak. The spool 7 is preferably formed of a conductive body, which makes it possible to form a magnetic circuit with the magnet 21, the conductive annular body 25 and the bobbin body 7a so that the braking force acting on the conductive annular body 25 can be increased.

The moving member 28 is configured in a cylindrical shape so that a spool shaft (support) can be inserted thereto, which is movable in the axial direction along the spool shaft, and has the conductive annular body 25 fixed to the outer peripheral surface of the moving member 28. A recess 28a is formed on the side of the left frame 2a of the moving member 28, and one end of an energizing member (energizing spring) 30 abuts on the bottom of the recess. The other end of the energizing spring 30 is attached to a retainer 5c fixed to the support 7d whereby the moving member 28 is constantly energized toward the axially inner side (the side of the fixing member 40 described later.)

In addition, the fixing member 40 is disposed between the central annular wall 7c and the support 7d of the spool 7 (to be rotatable integrally with the spool 7.) The fixing member 40 and the moving member 28 are each provided with a cam portion 50 that faces each other on the counter surface in the axial direction, and the conductive annular body 25 moves so that the relative position with respect to the magnet 21 can be changed depending on the spool rotation speed at the time of casting. That is, the moving member 28 to which the conductive annular body 25 is attached is energized by the energizing force of the energizing member 30 to move axially inward, but the moving member 28 is moved, by the action of the cam portion 50, to the left frame 2a side along the axial direction against the energizing force of the energizing member 30 due to the high-speed rotation of the spool 5 during casting and the magnetic action of the magnetic field generating portion 20A.

The cam portion 50 is not described in detail as it is generally known. Each of the counter surfaces is provided with a cam surface which is shaped to move the moving member 28 along the spool shaft due to the fixing member 40 that rotates integrally with the spool 7.

Specifically, when the clutch mechanism is turned off and the spool 7 is rotated in the fishing line releasing direction, as the rotation speed of the fixing member 40 increases together with that of the spool 7, the axial component force acting on the cam surface increases. When the axial component force becomes larger than the energizing force of the energizing member 30, the moving member 28 moves toward the left frame 2a, and the annular wall portion 25b moves in the axial direction, approaching the tip end surface 21a of the magnet 21. Further, when the rotation speed of the fixing member 40 decreases together with that of the spool, the moving member 28 moves toward the right frame 2b by the energizing force of the energizing member 30, and the annular wall portion 25b moves in the axial direction, moving away from the tip end surface 21a of the magnets 21. That is, in the spool braking device of the example, with the increase in the rotation speed of the spool 7, the annular wall portion 25b approaches the tip end surface 21a of the magnet 21 to increase the braking force, and with the reduction in the spool rotation speed, the annular wall portion 25b moves away from the tip end surface 21a of the magnet 21 to reduce the braking force.

In this example, by appropriately modifying the inclination angle of each cam surface formed on the moving member 28 and the fixing member 40, and the energizing force or the like of the energizing spring 30, it is possible to adjust the moving amount of the moving member 28 to change the braking characteristics, and to adjust the braking force that acts when the spool rotates by changing by the operation member 23 the initial position of the axial facing distance of the magnet 21 with respect to the annular wall portion 25b.

It is preferable that the moving member 28 and the fixing member 40 are made of materials with high rigidity and high wear resistance, and low specific gravity, which include, for example, resins such as ABS resin, PC resin, nylon resin, polyacetal resin and POM resin, as well as light metals such as aluminum.

The spool braking device 20 can reduce the size and weight of the reel body since the magnet 21 and the conductive annular body 25 of the magnetic field generating portion 20A are accommodated and arranged in the limited space (the accommodation space S) within the spool width inside the bobbin body 7a of the spool 7 and further, can realize low inertia of the spool, and improve the braking efficiency of the spool and the casting performance since the magnetic field generating portion is compactly accommodated in the bobbin body.

In addition, the cylindrical portion 25a and the annular wall portion 25b are formed on the conductive annular body 25 to face the magnet in the radial direction, and the magnetic force is changed by displacing the relative position with respect to the tip end surface 21a of the magnet 21 in the axial direction, which make it possible to make the magnetic field generating portion compact in the radial and axial directions, and to obtain efficient braking characteristics. Further, efficiently accommodating and arranging the magnetic field generating portion within the spool width and the bobbin body can increase the variations in the amount of fishing line wound around the spool.

Further, in the configuration of the example, magnetic lines of force (magnetic circuits) are formed by the magnet 21 on the inner periphery of the cylindrical portion 25a of the conductive annular body 25, the annular wall portion 25b and the bobbin body 7a so that efficient braking characteristics can be obtained.

The examples have been described above. However, this disclosure is not limited to the above-described examples, and various variations may be made.

Our reels are characterized in that the spool braking device 20, in particular, the magnetic field generating portion 20A which is a component of the spool braking device 20, is accommodated and arranged in the bobbin body 7a of the spool 7, and the shape and configuration of the reel body are not particularly limited. Further, the configuration of the magnetic field generating portion 20A of the spool braking device 20 is not limited to the example described above, and various variations can be made. For example, the relative position of the conductive annular body 25 with respect to the magnet 21 may be changed not only in the axial direction as described in the above-described example but also in the radial direction. Further, the configuration in which the magnet 21 is movable in the axial direction can be appropriately modified by, for example, using a gear system or a cam system between the magnet 21 and the operation member.

The relative position in which the magnet 21 faces the conductive annular body 25 is appropriately changed in accordance with the braking characteristics, the reel specifications and the like in consideration of the overlapping area in the radial direction on which the magnetic force to the cylindrical portion 25a acts, the opposing distance in the axial direction from the annular wall portion 25b, and other related matters.

The invention claimed is:

1. A double bearing reel comprising a spool braking device that rotatably supports a spool including a bobbin body on which a fishing line is wound and flange portions formed on both sides of the bobbin body between side plates of a reel body and that applies a braking force to the rotation of the spool, wherein the spool braking device includes a conductive annular body that rotates integrally with the spool and a magnet facing an outer peripheral surface of the conductive annular body, and the conductive annular body and the magnet are disposed axially inward of an outer end surface of the flange portions and radially inward of the bobbin body.

2. The double bearing reel according to claim 1, wherein the conductive annular body moves to change its relative position with respect to the magnet depending on the spool rotation speed.

3. The double bearing reel according to claim 1, wherein the conductive annular body comprises a cylindrical portion facing a radial direction, and an annular wall portion facing an axial direction, with respect to the magnet.

4. The double bearing reel according to claim 1, wherein the magnet is movable in an axial direction by an operation of an external operation member provided on the side plates.

* * * * *